United States Patent
Bain et al.

(10) Patent No.: US 9,779,383 B2
(45) Date of Patent: Oct. 3, 2017

(54) INTELLIGENT POINT OF PURCHASE APPARATUS

(71) Applicant: GoPro, Inc., San Mateo, CA (US)

(72) Inventors: Peter William Bain, San Francisco, CA (US); Colleen Erin Juretus, El Granada, CA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/090,332

(22) Filed: Apr. 4, 2016

(65) Prior Publication Data

US 2016/0292631 A1    Oct. 6, 2016

Related U.S. Application Data

(60) Provisional application No. 62/142,966, filed on Apr. 3, 2015.

(51) Int. Cl.
*G06F 19/00* (2011.01)
*G06Q 10/08* (2012.01)

(52) U.S. Cl.
CPC .................. *G06Q 10/087* (2013.01)

(58) Field of Classification Search
CPC ........................ G06Q 10/087; G06Q 10/08
USPC ...................................... 235/385, 383, 380
See application file for complete search history.

(56) References Cited

U.S. PATENT DOCUMENTS

| | | | |
|---|---|---|---|
| 7,805,374 B2* | 9/2010 | Fein | G06F 21/10 705/52 |
| 2009/0229795 A1* | 9/2009 | Takatomi | B29C 49/6427 165/120 |
| 2014/0351068 A1* | 11/2014 | Renfroe | G06Q 30/0641 705/15 |

* cited by examiner

*Primary Examiner* — Daniel St Cyr
(74) *Attorney, Agent, or Firm* — Fenwick & West LLP

(57) ABSTRACT

Embodiments relate to system, method and computer readable storage medium that includes matching media content with inventory, the media content for display within a point of purchase apparatus. The apparatus is identified by a remote system using a computer remote at the apparatus. The physical inventory within the identified apparatus remotely identifiable and matchable to remotely available media content stored at the remote system for subsequent display at the point of purchase apparatus.

19 Claims, 9 Drawing Sheets

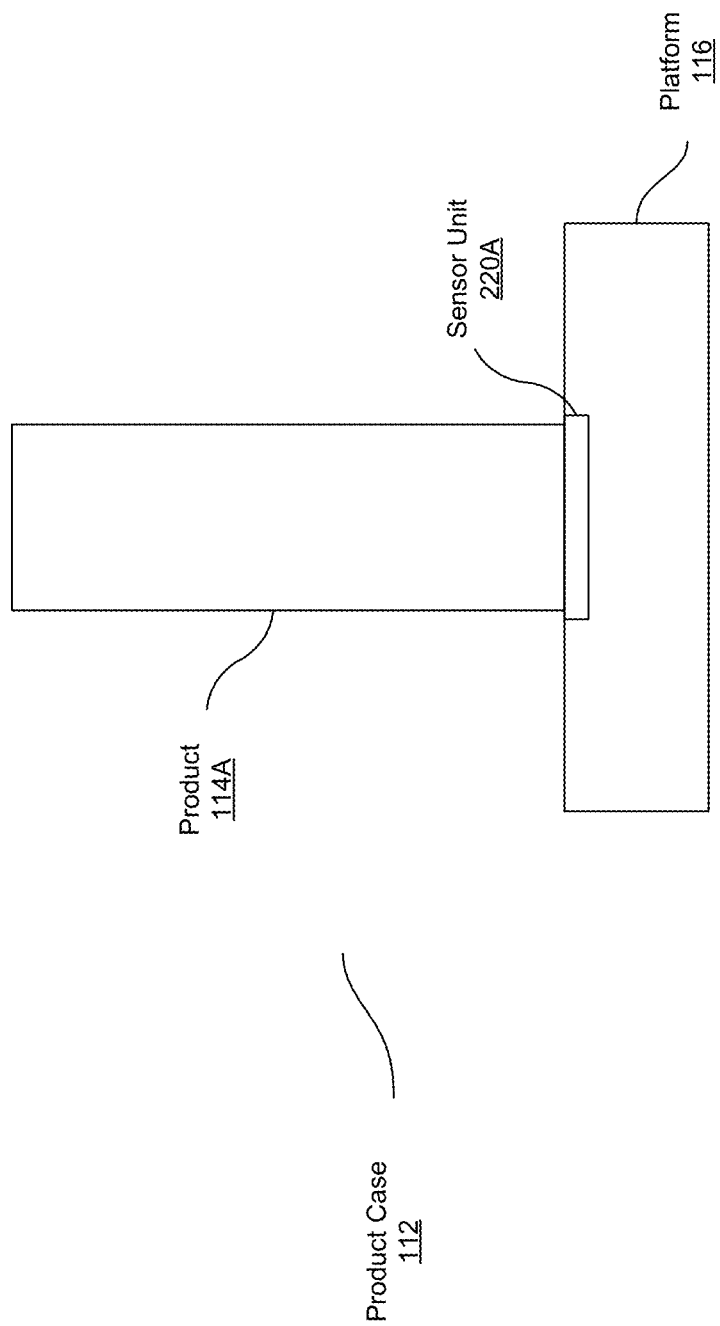

“apparatus 100”) may include, by way of example, a video
INTELLIGENT POINT OF PURCHASE APPARATUS

CROSS REFERENCE TO RELATED APPLICATIONS

This application claims the benefit of U.S. Provisional Application 62/142,966, filed Apr. 3, 2015, which is incorporated by reference in its entirety.

BACKGROUND

1. Field of the Disclosure

This disclosure generally relates to a point of purchase apparatus, and more specifically to an intelligent point of purchase apparatus.

2. Description of the Related Art

Merchants often use a point of purchase apparatus to display media content associated with products for purchase. A typical point of purchase apparatus can include independent components such as products, platforms on which the products are showcased, accessories, rail-racks on which the accessories are showcased, and a point of sales video monitor on which media content related to the products and/or accessories is displayed.

Independent components of the typical point of purchase apparatus do not allow for tracking of configuration of the point of sale video monitor. For example, the point of sale video monitor does not necessarily display media content representative of the physical inventory in the point of purchase apparatus. The independent components also do not allow for tracking of inventory flow nor do they allow for product placement.

BRIEF DESCRIPTION OF THE DRAWINGS

The teachings of the embodiments disclosed herein can be readily understood by considering the following detailed description in conjunction with the accompanying drawings.

FIG. 2A is a block diagram of a side view of a product case including a product, a platform, and sensor unit, according to one example embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One example embodiment of a disclosed system (and method and computer readable storage medium) includes matching media content with inventory, with the media content available for display within a point of purchase apparatus. A point of purchase apparatus may be identified by a remote system using a computer remote at the point of purchase apparatus. The physical inventory within the point of purchase apparatus can be remotely identifiable and matchable by the remote system to available media content. The media content can be remote or local to the point of purchase apparatus and can be loaded for subsequent display at the point of purchase apparatus. For example, the remote system can determine media content corresponding with the physical inventory within the point of purchase apparatus. The remote system may transmit the determined media content to the point of purchase apparatus for display on a video monitor of the point of purchase apparatus. While a transaction may be completed at the point of purchase apparatus (e.g., one equipped with a payment system), it is not necessary. The point of purchase apparatus may be a standalone apparatus (e.g., a kiosk) to hold and track inventory as is further described herein.

It is noted that the point of purchase apparatus refers to a display case comprising video monitor and at least one item available for display and/or purchase.

Example Intelligent Point of Purchase Apparatus

Figure 1:
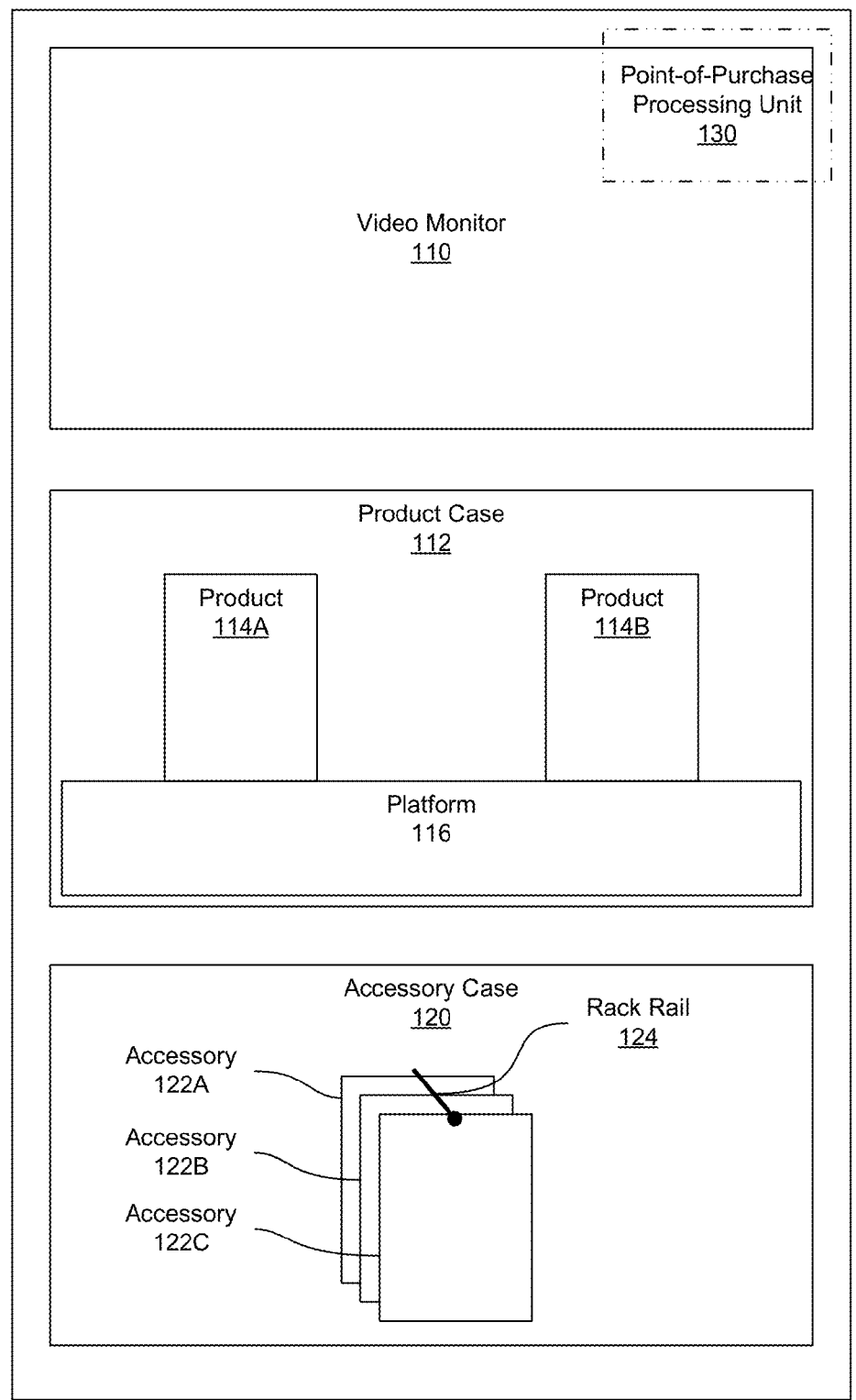
FIG. 1 is a block diagram illustrating a front view of an intelligent point of purchase apparatus including a video monitor, a product case, and an accessories case, according to one example.

Turning to FIG. 1, it shows a block diagram of an example intelligent point of purchase apparatus 100. The intelligent point of purchase apparatus 100 (hereinafter referred to as "apparatus 100") may include, by way of example, a video monitor 110, a product case 112, an accessory case 120, and a point of purchase processing unit 130 (hereinafter referred to as "processing unit 130"). In the example apparatus 100 shown in FIG. 1, the video monitor 110 may be located along a top portion of the apparatus 100. Below the video monitor 110 may be the product case 112 and below the product case 112 may be the accessory case 120. The video monitor 110 can be an electronic device that provides visual playback of media content. Examples of the video monitor 110 include a television and a monitor. The product case 112 may include one or more products 114 on a platform 116. The accessory case 120 may include accessory 122A, accessory 122B, and accessory 122C (hereinafter collectively referred to as "accessories 122") hanging from a rack rail 124.

FIG. 2A is a block diagram of a side view of the example product case 112 shown in FIG. 1. A product 114A rests on the platform 116. The platform 116 may include a sensor unit 220A for sensing the product 114A.

Figure 2B:
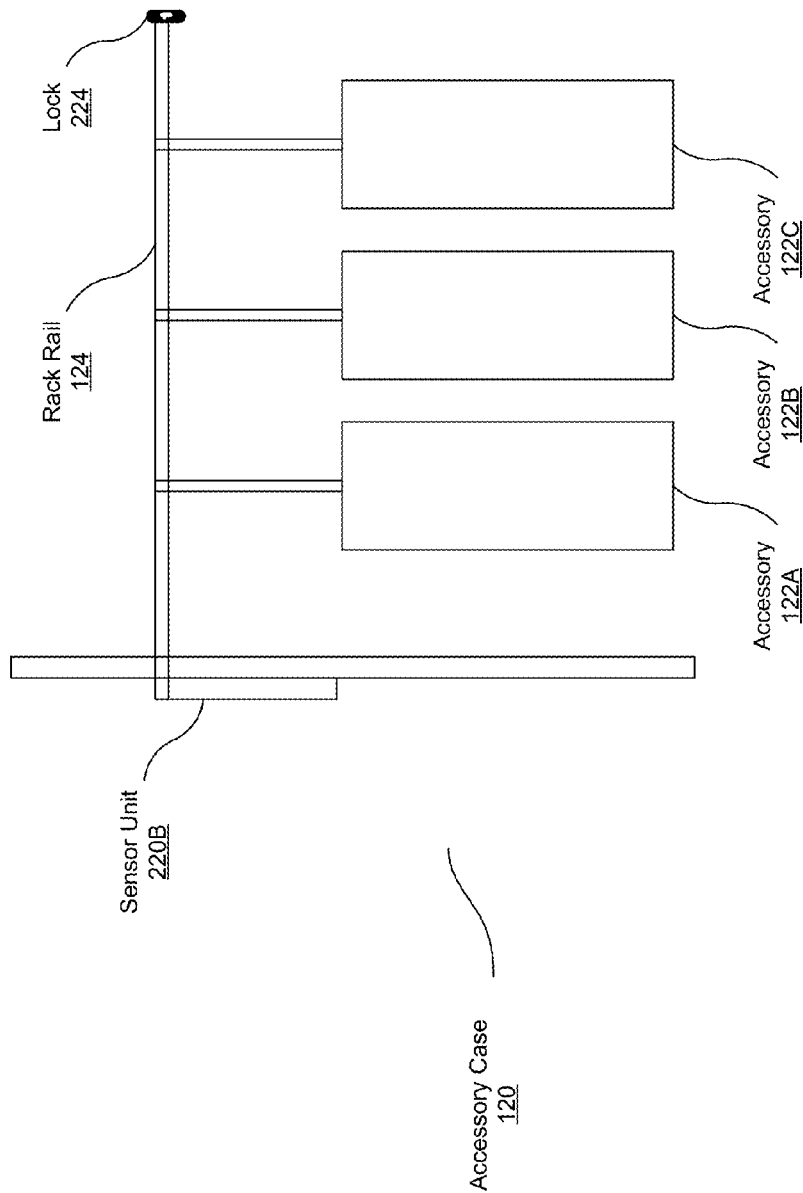
FIG. 2B is a block diagram of a side view of an accessories case including accessories, a rack rail, a lock, and a sensor unit, according to one example embodiment.

FIG. 2B is a block diagram of a side view of the example accessory case 120 shown in FIG. 1. The accessories 122 hang from the rack rail 124. The front end of rack rail 124 includes a lock 224 to prevent unauthorized removal of the accessories 122. The back end of the rack rail 124 includes a sensor unit 220B for sensing the accessories 122.

Figure 3A:
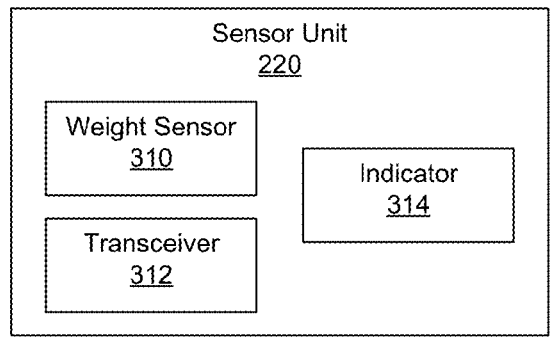
FIG. 3A is a block diagram of a sensor unit, according to one example embodiment.

FIG. 3A is a block diagram of a sensor unit 220, according to one example embodiment. The sensor unit 220 may include a weight sensor 310, a transceiver 312, and an indicator 314. The weight sensor 310 weighs an inventory item on or otherwise connected to the sensor unit 220.

The transceiver 312 of the sensor unit 220 may transmit a weight reading from the weight sensor 310 to a transceiver (e.g., transceiver 322) of the processing unit 130. The transceiver 312 receives a weight signal from the transceiver of the processing unit 130. If the weight signal received by transceiver 312 may be indicative of the weight reading by weight sensor 310 as not being an expected value, the sensor unit 220 enables the indicator 314. The indicator 314 may include a speaker and/or a light emitting element (e.g., a light emitting diode (LED)) for audible and/or visual feedback, respectively. In one example, the sensor unit 220 is used for inventory item placement. If the inventory item is not located in an expected place within the apparatus 100, the sensor unit 220 may enable the indicator 314 to indicate the improper placement of the inventory item. In another example, if the inventory item is removed from an expected place, the sensor unit 220 enables the indicator 314 to indicate the unexpected removal of the inventory. In this example, the sensor unit 220 also can be used for other applications such as possible theft identification.

Figure 3B:
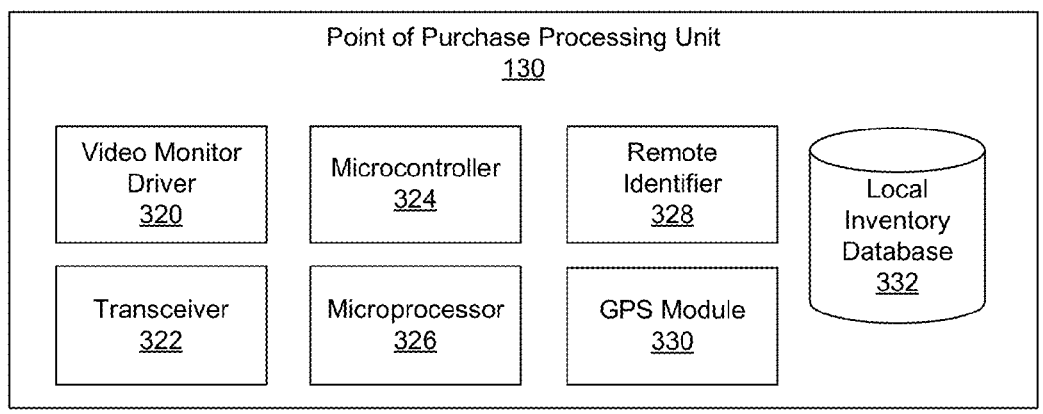
FIG. 3B is a block diagram of a point of purchase processing unit, according to one example embodiment.

FIG. 3B is a block diagram of the processing unit 130, according to one example embodiment. The processing unit 130 can include a video monitor driver 320, a transceiver 322, a microcontroller 324, a microprocessor 326, a remote identifier 328, a GPS module 330, and a local inventory database 332. The processing unit 130 can be, for example, an example machine able to read instructions from a machine-readable medium and execute the instructions in the microprocessor 326 and/or the microcontroller 324. An example computing configuration of such a machine is described with FIG. 7.

The transceiver 322 can be configured to receive a weight reading from the weight sensor 310 of the sensor unit 220. After receiving weight reading, the microcontroller 324 and the microprocessor 326 may check the local inventory database 332 for the expected weight of the inventory item associated with the weight sensor. Responsive to the weight reading not being the expected weight, the transceiver 322 sends a weight signal to the transceiver 312 of the sensor unit 220, the weight signal indicative of the weight reading by the weight sensor 310 of the sensor unit 220 as not being the expected value.

The local inventory database 332 may store inventory information related to the physical inventory of the apparatus 100, such as inventory item weight, quantity, and desired placement within the apparatus 100. The local inventory database 332 further may store inventory identifying parameters such as SKU numbers, model numbers, model names, part numbers, etc. The processing unit 130 can update the inventory information stored at the local inventory database 332 based on an electronic tag, such as, for example, a radio-frequency identification (RFID) chip, on each inventory item within the apparatus 100. The apparatus 100 can include an electronic tag reader, such as, for example, an RFID reader. The processing unit 130 can use the RFID reader to determine if a new inventory item is placed within the apparatus 100 or if an inventory item is removed from within the apparatus 100. The processing unit 130 can update the local inventory database 332 based on the determination.

In one example embodiment, the video monitor driver 320 configures desired inventory placement of the products 114 and the accessories 122 using the microcontroller 324 and the microprocessor 326 for display on the video monitor 110. Responsive to the weight reading not being the expected weight, the video monitor driver 320 configures display of inventory at the sensor unit 220 on the video monitor 110 to reflect the weight reading as not being the expected value.

The transceiver 322 also may be configured to receive media content from a transceiver (e.g., transceiver 418) of a content management system (e.g., content management system 400). The video monitor driver 320 may configure the received media content using the microcontroller 324 and the microprocessor 326 for display on the video monitor 110.

Figure 4:
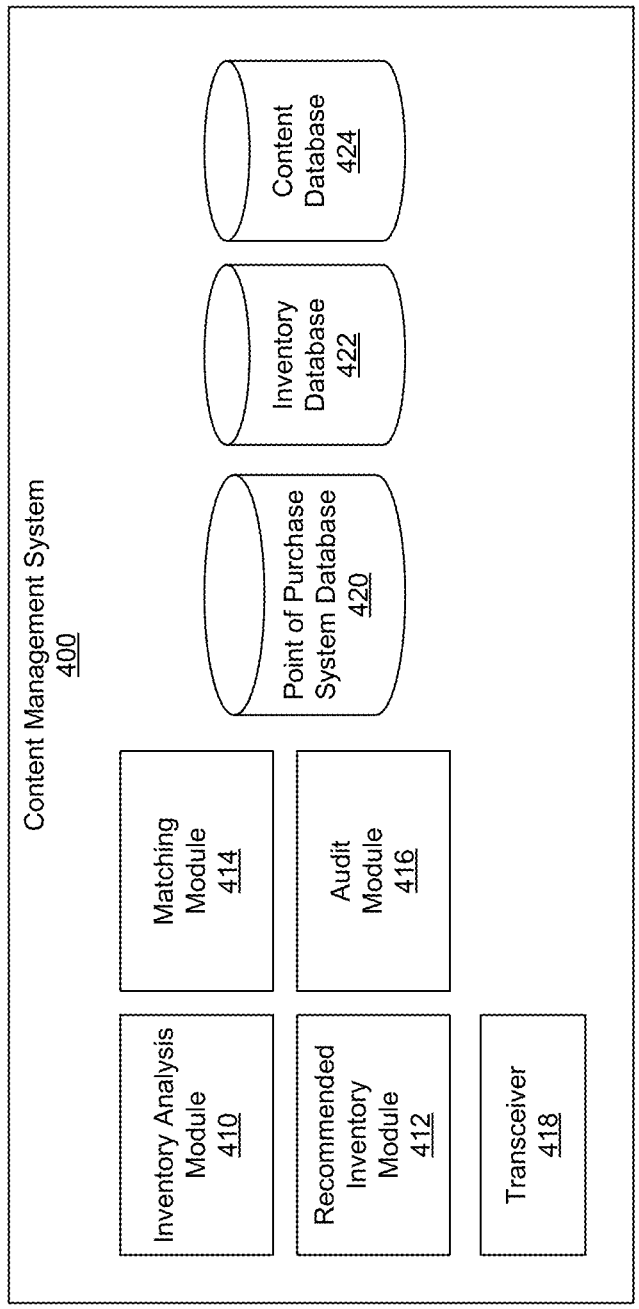
FIG. 4 is a block diagram of a content management system, according to one example embodiment.

FIG. 4 is a block diagram of a content management system 400 (hereinafter referred to as "system 400"), according to one example embodiment. The system 400 may include an inventory analysis module 410, a recommended inventory module 412, a matching module 414, an audit module 416, a transceiver 418, a point-of-purchase system database 420, an inventory database 422, and a content database 424. The system 400 can be, for example, an example machine able to read instructions from a machine-readable medium and execute the instructions in a processor (or a controller). An example computing configuration of such a machine is described with FIG. 7.

The transceiver 418 of the system 400 may communicate with the remote identifier 328 of the processing unit 130 via the transceiver 322 of the processing unit 130 of the apparatus 100. In one example embodiment, the remote identifier 328 may be selected from a list of identifiers identifying various intelligent point of purchase apparatuses, the list stored in the point of purchase system database 420. After the system 400 successfully identifies the apparatus 100 via the remote identifier 328, the system 400 requests access to the local inventory database 332 of the processing unit 130. The inventory analysis module 410 may be configured to analyze the accessed local inventory database 332 corresponding with the identified apparatus 100 and determine what is or is not within the analyzed inventory. The analyzed inventory is stored in the inventory database 422.

In one example embodiment, the audit module 416 of the system 400 may be configured to communicate with a retailer housing the apparatus 100. The audit module 416 may request access to an inventory database of the retailer. The audit module 416 may be configured to compare the analyzed inventory in the inventory database 422 associated with the identified apparatus 100 with inventory information in the inventory database of the retailer for consistency. The audit module 416 may include an application program interface (API) to communicate with the retailer to obtain access to the retailer's inventory database.

The matching module 414 may be configured to determine media content from the content database 424 corresponding with the analyzed inventory in the inventory database 422. The transceiver 418 transmits the determined media content to the transceiver 322 of the processing unit 130 for display on the video monitor 110.

In one example embodiment, the matching module 414 may be configured to request access to the GPS module 330 of the processing unit 130 of the apparatus 100. The matching module 414 may be configured to determine media content corresponding with the seasonal time of the year based off data from the GPS module 330. For example, if the season associated to the location of the identified apparatus 100 corresponds with winter, the matching module 414 determines media content related to winter activities such as snowboarding, skiing, sledging, and other snow related activities. However, the matching module 414 would not determine media content related to other seasons such as fall, spring and summer.

In one example embodiment, the matching module 414 may be configured to determine media content corresponding to data associated historical inventory trends of the inventory in the inventory database 422 corresponding with the identified apparatus 100. For example, if the historical inventory trend shows the accessory 122A sells more than the accessory 122B, media content related to the accessory 122A will be determined to continue sales of the accessory 122A. In another example, if the historical inventory trend shows the accessory 122A sells more than the accessory 122B, media content related to the accessory 122B will be determined to increase sales of the accessory 122B.

The recommended inventory module 412 may be configured to use analyzed inventory in the inventory database 422 to determine an inventory restock recommendation. In one example embodiment, the inventory restock recommendation is associated with the seasonal time of the year at the location of the apparatus 100. In another example embodiment, the inventory restock recommendation is associated with historical trends of the inventory in the inventory database 422 corresponding with the apparatus 100.

Figure 5A:
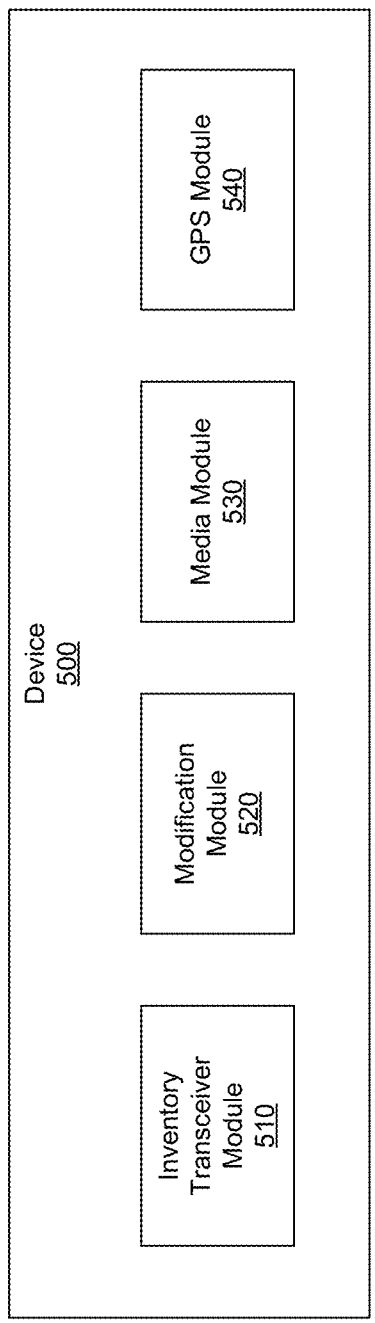
FIG. 5A is a block diagram of a device, according to one example embodiment.

FIG. 5A is a block diagram of a device 500, according to one example embodiment. The device 500 may include an inventory transceiver module 510, a modification module 520, a media module 530 and a GPS module 540. The device 500 can be, for example, an example machine able to read instructions from a machine-readable medium and execute the instructions in a processor (or a controller). An example computing configuration of such a machine is described with FIG. 7. In one example embodiment, the device 500 may be configured to aggregate and control data gathering. Each module of the device 500 may be communicatively coupled with each other as further described herein. In addition, in one example embodiment, the device 500 comprises a mobile device (e.g., a smartphone or tablet).

The inventory transceiver module 510 may be configured to receive inventory data from the apparatus 100 and verify the received inventory data with inventory data stored in the inventory database 422 of the system 400. The inventory transceiver module 510 also may be configured to identify the apparatus 100 and the inventory within the apparatus 100. For example, the inventory transceiver module 510 can include a camera to scan a barcode on the apparatus 100, the barcode identifying the apparatus 100 and/or a barcode on an inventory item, the barcode identifying the inventory item. In another example, the inventory transceiver module 510 may include an electronic tag reader, such as, for example, RFID reader (receiver), and the apparatus 100 and the inventory within the apparatus 100 can include an electronic tag, such as, for example, a RFID chip (transmitter). In this example, the RFID reader of the inventory transceiver module 510 identifies the apparatus 100 by reading the RFID chip of the apparatus 100 and identifies the inventory within the apparatus 100 by reading the RFID chip of the inventory item.

Figure 5B:
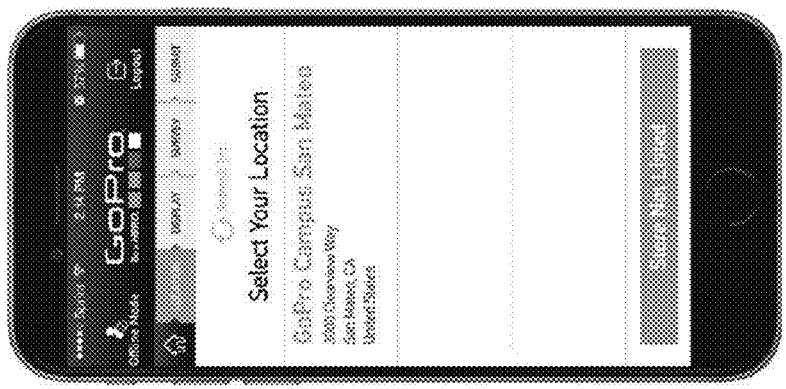
FIG. 5B illustrates example user interfaces for use in a system as disclosed herein, according to one example embodiment.
Figure 5B:
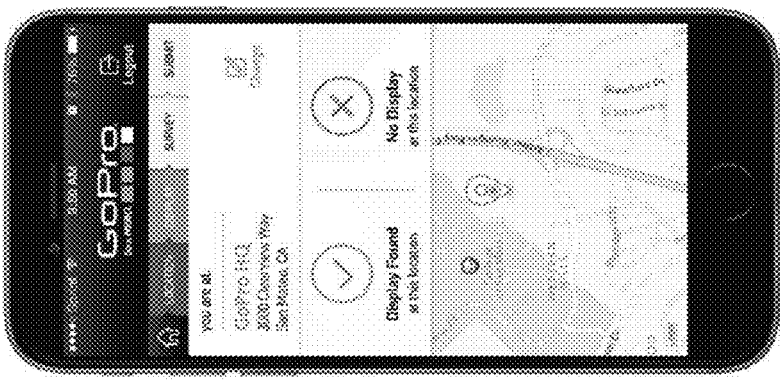
Figure 5B:
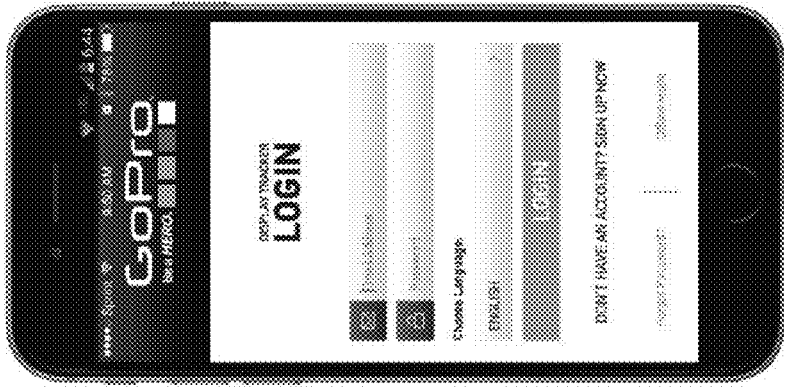

After the inventory transceiver module 510 identifies the apparatus 100, the inventory transceiver module 510 may authenticate with the identified apparatus 100. For example, the inventory transceiver module 510 can prompt a user of the device 500 to login using login credentials as illustrated in the example user interface in 552 of FIG. 5B. In this example, the login credentials are linked to the identified apparatus 100. In another example, the inventory transceiver module 510 can use the GPS module 540 of the device 500 and the GPS module 330 of the processing unit 130 of the identified apparatus 100 to authenticate with the identified apparatus via GPS coordinates. The inventory transceiver module 510 may prompt the user to confirm the nearest apparatus 100 as illustrated in the example user interface 554 of FIG. 5B. Alternatively, the inventory transceiver module 510 can prompt the user to select the location of the apparatus 100 as illustrated in the example user interface 556 of FIG. 5B.

After successfully authenticating with the identified apparatus 100, the inventory transceiver module 510 may receive access to the local inventory database 332 of the processing unit 130 of the identified apparatus 100. The inventory transceiver module 510 may be configured to communicate with the system 400 to crosscheck inventory data of the local inventory database 332 and the inventory database 442 of the system 400.

The modification module 520 may be configured to receive modification information of the local inventory database 332. In one example embodiment, the modification module 520 receives the modification from the user of the device 500. For example, the identified apparatus 100 may not be accurately collecting inventory data. In this example, the local inventory database 332 can be modified to accurately represent the inventory physically present in the apparatus 100. The modification module 520 also may be configured to communicate the modifications of the local inventory database 322 to the apparatus 100 and to the system 400.

The media module 530 may be configured to receive media content from the system 400 and instruct the system 400 to transmit selected media content to the apparatus 100. In one example embodiment, the media module 530 receives access to media content stored in the content database 424 currently displayed on and in queue for display on the video monitor 110 of the apparatus 100, where the media content may be related to the local inventory database 332 of the apparatus 100. The media module 530 also may be configured to display the accessed media content, for example, via the display 710 of FIG. 7, further described with FIG. 7. The media module 530 may receive queue information for the media content (e.g., pause, play, fast-forward, rewind, skip and replay) and transmits the received queue information to the system 400. In another example embodiment, the media module 530 receives access to the content database 424. The media module 530 may receive a search query and transmit the search query to the system 400. The media module 530 may be configured to receive access to media content on the content database 424 after matching the search query. The media module 530 also may display the accessed media content, for example, via the display 710, further described with FIG. 7. In addition, the media module 530 may receive selection of accessed media content and transmit the selection to the system 400 to transmit to the apparatus 100.

Figure 6:
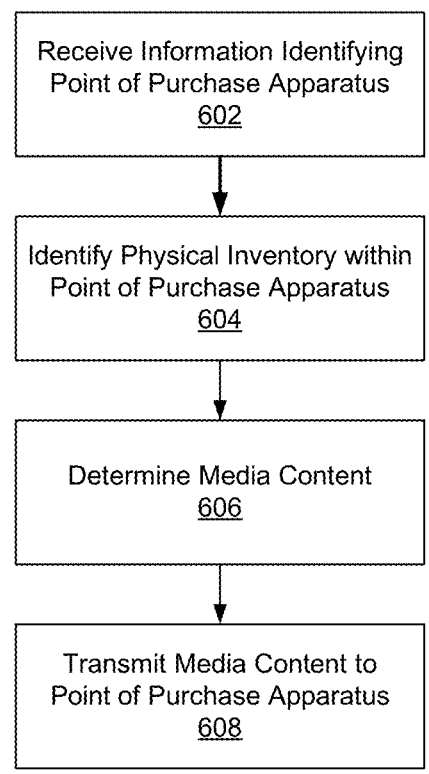
FIG. 6 is a flow chart of a method for matching media content with inventory, according to one example embodiment.

FIG. 6 is a flow chart of an example method for matching media content with inventory, according to one example embodiment. The system 400 may receive 602, via the remote identifier 328, information identifying the apparatus 100. After, the system 400 identifies 604 physical inventory information (e.g., determines parameters such as SKU numbers, model, type, quantity, etc.) stored at the local inventory database 332. The matching module 414 of the system 400 determines 606 media content corresponding with the physical inventory of the apparatus 100. For the matching, the matching module 414 can evaluate one or more data factors of the physical inventory that can be compared against metadata data information associated with the media content. The transceiver 418 of the system 400 can transmit 608 determined media content to the transceiver 322 of the processing unit 130 of the apparatus 100.

In one example embodiment, program code at the apparatus 100 identifies 604 the physical inventory information. The system 400 receives 602 information identifying the apparatus 100 and physical inventory information of the apparatus 100. After, the system 400 determines 606 media content corresponding with the physical inventory of the apparatus 100 and transmits 608 determined media content to the apparatus 100.

In another example embodiment, the system 400 receives 602 inventory information from both the apparatus 100 and from a retailer housing the apparatus 100. The system 400 identifies 604 the received inventory information. In this example identifying 604 further includes matching inventory information from the apparatus 100 to inventory information from the retailer thereby ensuring consistency between the apparatus 100 and the retailer.

The media content to be transmitted to the apparatus 100 may be based on one or more data factors. Examples of factors include inventory present at the apparatus 100, store or kiosk corresponding with where the apparatus 100 is located (e.g., city/state; type of store or kiosk), time of year (e.g., season), time of day (e.g., morning, afternoon, evening or some set hours), location (e.g., city/state and/or neighborhood and/or store address) of the apparatus 100, marketing focus (e.g., new product releases), and/or sales objectives (e.g., see a predefined quantity of a particular camera or accessory).

By way of further example, if the apparatus 100 is based in a ski resort location in the spring time period, skiing season may be winding down and mountain biking season may be picking up. The system 400 receives, via the remote identifier 328 of the processing unit 130 of the apparatus 100, information identifying the apparatus 100. The system 400 receives inventory information from the local inventory database 332 of the processing unit 130 corresponding with available physical inventory in the apparatus 100. In one example embodiment, the system 400 receives inventory information from both the apparatus 100 and from a retailer housing the apparatus 100. In this example embodiment, the system 400 matches the inventory information from the apparatus 100 with inventory information from the retailer thereby ensuring consistency between information in the local inventory database 332 and the inventory database of the retailer.

Continuing the example, the inventory analysis module 410 of the system 400 identifies the inventory and can analyze and categorize it based on season. For example, ski helmet mount accessories may still be available in the apparatus 100 along with bicycle mount accessories. Ski helmet mount accessories may be associated with both winter and spring seasons and bicycle mount accessories may be associated with both spring and summer seasons. The inventory analysis module 410 stores analyzed inventory in the inventory database 422 of the system 400. The matching module 414 of the system 400 may use data from the GPS module 330 of the processing unit 130 of the apparatus 100 to collect data from external sources (e.g., weather information corresponding with the location where the apparatus 100 is located). The matching module 414 determines if there are any marketing programs available (e.g., end of season inventory reduction and ramp up of new seasonal accessories) and corresponding sales objectives (e.g., exhaust end of season inventory within two weeks and/or provide promotional campaigns such as downloadable coupons or promotional codes). The matching module 414 processes the internal data (e.g., physical inventory information from the apparatus 100 and corresponding additional data kept by the company on the system 400) with external data (e.g., weather information and season information) as well as marketing programs and sales objectives to determine what media content from the content database 424 to push to the apparatus 100 for playback on the video monitor 110. This media content may be singular or a plurality (2 or more) based on the factors noted.

Continuing with the example, consider a weather information in the form of a weather report for the location of the apparatus 100 is of the type that corresponds with snow (e.g., 0 degrees Celsius (C) and light snow) beginning at 6 AM and gradually rising (e.g., to 10 degrees C.) by 2 PM. Using information about the location where the apparatus 100 is located (e.g., store and city/state), received data from the local inventory database 332 of the processing unit 130 of the apparatus 100, and marketing and sales related information, the matching module 414 of the system 400 may lookup media content in the content database 424. The matching module 414 may match information relating to the apparatus 100 with media content based on relevant metadata tags associated with the received data and the marketing and sales related information (e.g., activity tag, location tag, marketing tag, etc.). Metadata tags may also be associated with media content stored in the content database 424. Once selected from the content database 424, the system 400 transmits the media content to the apparatus 100. In this example, the media content may be video media corresponding with skiing for playback on the video monitor 110 of the apparatus 110 from 6 AM to 12 PM. The video media content highlight ski helmet mounts that skiers may find appealing to purchase out of the apparatus 100. Thereafter, the system 400 may select, retrieve and transmit from 12 PM until 6 PM content that highlights new bicycle mounts that mountain bikers may find appealing to purchase out of the apparatus 100. This latter content corresponds with the warming that is occurring at the location and time of season when rugged mountain biking is appealing to those at the location.

Further continuing with the example, as the season transformation progresses and ski season winds down and/or inventory corresponding with ski season is exhausted, the media content transmitted to the apparatus 100 may continue to evolve to match the inventory available or sought to be marketed. The recommended inventory module 416 of the system 400 may be configured to determine if there are any marketing programs available (e.g., end of season inventory reduction and ramp up of new seasonal accessories) and corresponding sales objectives (e.g., exhaust end of season inventory within two weeks and/or provide promotional campaigns such as downloadable coupons or promotional codes). The recommended inventory module 412 may be configured to process the analyzed inventory in the inventory database 422, marketing program information and sales objectives to provide the apparatus 100 with an inventory recommendation. In one example embodiment, the inventory recommendation is provided to the retailer housing the apparatus 100. In one example embodiment, the recommended inventory module 412 further processes data associated with historical inventory trends at the apparatus 100, and uses the historical inventory trend to provide the apparatus 100 with an inventory recommendation.

Moreover, because the system 400 may track inventory from the apparatus 100, the recommended inventory module 412 may be configured to automatically determine new inventory to ship to the retailer housing the apparatus 100 based on the factors noted. As this inventory gets stocked into the apparatus 100, the system 400 may update the media content to the apparatus 100 accordingly.

Computing Machine Architecture

Figure 7:
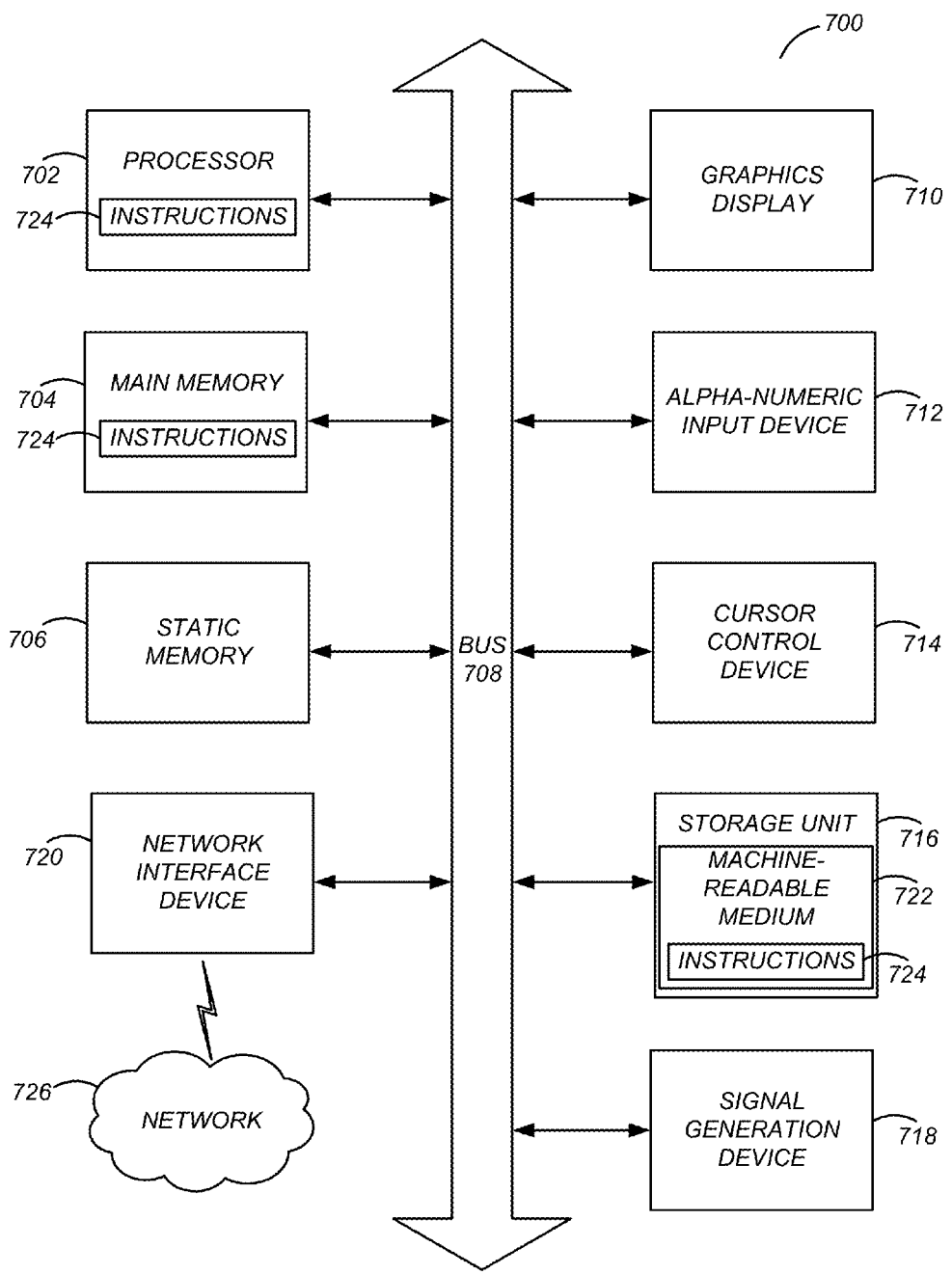
FIG. 7 illustrates one embodiment of components of an example machine able to read instructions from a machine-readable medium and execute them in a processor (or controller).

FIG. 7 is a block diagram illustrating components of an example machine able to read instructions from a machine-readable medium and execute them in a processor (or controller). The machine may be a point of purchase processing unit 130, a content management system 400, or a device 500. Specifically, FIG. 7 shows a diagrammatic representation of an example machine in the example form of a computer system 700 within which instructions 724 (e.g., program code or software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include a graphics display unit 710 (e.g., a plasma display panel (PDP), an organic light emitting diode (OLED) display, a liquid crystal display (LCD), a projector, or a cathode ray tube (CRT)) and corresponding display drivers. The computer system 700 may also include an alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, or associated caches and servers) able to store instructions (e.g., the instructions 724). The term "machine-readable medium" shall also be taken to include any medium that is capable of storing instructions (e.g., the instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially describe, for example, an automated system for determining data factors (e.g., location and inventory) in an intelligent point of purchase apparatus 100 and transmitting media content associated with those factors to the apparatus 100 for playback on the video monitor 110. Moreover, the data factors provide additional data for updating inventory within the apparatus 100 while also being able to update the media content available for playback on the video monitor 110 when the inventory is loaded into the apparatus 100. Automatically associating the media content for playback with data factors, e.g., inventory, allows for increasing commerce activity (e.g., sale of inventory) through the apparatus 100 in a timely manner as there is a reduction in human reliance on factors such as making sure appropriate media content is loaded for playback on the video monitor 110 of the apparatus 100.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms, for example, as illustrated in FIGS. 1, 3A-B, 4 and 5A. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors (e.g., processor 702) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one example embodiment" or "an example embodiment" means that a particular element, feature, structure, or characteristic described in connection with the example embodiment is included in at least one example embodiment. The appearances of the phrase "in one example embodiment" in various places in the specification are not necessarily all referring to the same example embodiment.

Some example embodiments may be described using the expression "coupled" and "connected" along with their derivatives. For example, some example embodiments may be described using the term "coupled" to indicate that two or more elements are in direct physical or electrical contact. The term "coupled," however, may also mean that two or more elements are not in direct contact with each other, but yet still co-operate or interact with each other. The example embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the example embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for matching inventory with media content for display within a point of purchase apparatus through the disclosed principles herein. Thus, while particular example embodiments and applications have been illustrated and described, it is to be understood that the disclosed example embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of matching an inventory within a point of purchase apparatus with video media content for display at the point of purchase apparatus, the method comprising:

identifying, via a computer remote from a point of purchase apparatus, a location of the point of purchase apparatus, the point of purchase apparatus including a video monitor;

identifying the inventory within the point of purchase apparatus, the inventory comprising a plurality of products available for sale;

identifying one or more metadata tags associated with the of the plurality of products;

identifying one or more metadata tags associated with the location of the point of purchase apparatus;

automatically determining video media content to transmit to the point of purchase apparatus, the video media content having one or more metadata tags corresponding to at least one of the one or more metadata tags associated with the plurality of products and the one or more metadata tags associated with the location of the point of purchase apparatus; and transmitting the determined video media content to the point of purchase apparatus for display on the video monitor.

2. The method of claim 1, wherein the determined video media content further corresponds with a seasonal time of the year at the point of purchase apparatus.

3. The method of claim 1, wherein the determined video media content further corresponds with data associated with historical inventory trends at the point of purchase apparatus.

4. The method of claim 1, further comprising:

analyzing the identified inventory within the point of purchase apparatus to provide an inventory restock recommendation; and transmitting the inventory restock recommendation to a retailer housing the point of purchase apparatus.

5. The method of claim 4, wherein the inventory restock recommendation corresponds with data associated with a seasonal time of the year at the point of purchase apparatus.

6. The method of claim 5, wherein the inventory restock recommendation comprises an item identifier and quantity, the item identifier identifying at least one of a product and an accessory.

7. The method of claim 4, wherein the inventory restock recommendation corresponds with data associated with historical inventory trends at the point of purchase apparatus.

8. The method of claim 4, further comprising transmitting the inventory restock recommendation to the point of purchase apparatus.

9. The method of claim 1, further comprising:

analyzing the identified inventory within the point of purchase apparatus; and determining inventory to ship to a retailer housing the point of purchase apparatus.

10. The method of claim 1, wherein the inventory is physical inventory.

11. A non-transitory computer readable storage medium comprising stored instructions, the instructions to receive video media content associated with an inventory within a point of purchase apparatus, the instructions when executed by a processor cause the processor to:

receive video media content for display on a video monitor at the point of purchase apparatus; and display the received video media content on the video monitor, the received video media content being associated with the inventory within the point of purchase apparatus, the inventory comprising a plurality of products available for sale, the received video media content further having one or more metadata tags corresponding to at least one of one or more metadata tags associated with the plurality of products and one or more metadata tags associated with a location of the point of purchase apparatus.

12. The non-transitory computer readable storage medium of claim 11, wherein the received video media content is further associated with at least one of a seasonal time of the year at the point of purchase apparatus and data associated with historical inventory trends at the point of purchase apparatus.

13. A non-transitory computer readable storage medium comprising stored instructions, the instructions to place inventory within a point of purchase apparatus and to receive video media content associated with the inventory within the point of purchase apparatus, the instructions when executed by a processor cause the processor to:

display, on a video monitor at the point of purchase apparatus, an expected inventory placement within the point of purchase apparatus;

sense, via sensor units, inventory placement within the point of purchase apparatus;

responsive to sensing an unexpected inventory placement, display, on the video monitor, an indication of the unexpected inventory placement;

responsive to sensing the expected inventory placement or a correction of the unexpected inventory placement to the expected inventory placement:

receive video media content for display on the video monitor; and display the received video media content on the video monitor, the received video media content being associated with the inventory placement within the point of purchase apparatus, the inventory comprising a plurality of products available for sale, the received video media content further having one or more metadata tags corresponding to at least one of one or more metadata tags associated with the plurality of products and one or more metadata tags associated with a location of the point of purchase apparatus.

14. The non-transitory computer readable storage medium of claim 13, further comprising stored instructions that when executed by the processor cause the processor to indicate, via at least one of an audible device and a visual device, the unexpected inventory placement.

15. A non-transitory computer readable storage medium comprising stored instructions, the instructions when executed by a processor cause the processor to:

identify, via a computer remote from a point of purchase apparatus, a location of the point of purchase apparatus, the point of purchase apparatus including a video monitor;

identify an inventory within the point of purchase apparatus, the inventory comprising a plurality of products available for sale;

identify one or more metadata tags associated with the of the plurality of products;

identify one or more metadata tags associated with the location of the point of purchase apparatus;

automatically determine video media content to transmit to the point of purchase apparatus, the video media content having one or more metadata tags corresponding to at least one of the one or more metadata tags associated with the plurality of products and the one or more metadata tags associated with the location of the point of purchase apparatus; and transmit the determined video media content to the point of purchase apparatus for display on the video monitor.

16. The non-transitory computer readable storage medium of claim 15, wherein the determined video media content further corresponds with a seasonal time of the year at the point of purchase apparatus.

17. The non-transitory computer readable storage medium of claim 15, wherein the determined video media content further corresponds with data associated with historical inventory trends at the point of purchase apparatus.

18. The non-transitory computer readable storage medium of claim 15, further comprising stored instructions that when executed by the processor cause the processor to:

analyze the identified inventory within the point of purchase apparatus to provide an inventory restock recommendation; and transmit the inventory restock recommendation to a retailer housing the point of purchase apparatus.

19. The non-transitory computer readable storage medium of claim 15, further comprising stored instructions that when executed by the processor cause the processor to:

analyze the identified inventory within the point of purchase apparatus; and determine inventory to ship to a retailer housing the point of purchase apparatus.

* * * * *